(12) United States Patent  
Chung

(10) Patent No.: US 10,698,530 B2  
(45) Date of Patent: Jun. 30, 2020

(54) TOUCH DISPLAY DEVICE

(71) Applicant: EDITO Co., Ltd., Seoul (KR)

(72) Inventor: Chul Chung, Seoul (KR)

(73) Assignee: EDITO CO., LTD., Seoul (KR)

( * ) Notice: Subject to any disclaimer, the term of this patent is extended or adjusted under 35 U.S.C. 154(b) by 0 days.

(21) Appl. No.: 16/270,609

(22) Filed: Feb. 8, 2019

(65) Prior Publication Data

US 2019/0250759 A1 Aug. 15, 2019

Related U.S. Application Data

(60) Provisional application No. 62/628,299, filed on Feb. 9, 2018.

(51) Int. Cl.
| | | |
|---|---|---|
| *G06F 3/041* | (2006.01) |
| *G06F 3/14* | (2006.01) |
| *G09G 5/14* | (2006.01) |
| *G09G 5/373* | (2006.01) |
| *G06F 3/0484* | (2013.01) |

(52) U.S. Cl.
CPC ........ *G06F 3/0416* (2013.01); *G06F 3/04845* (2013.01); *G06F 3/1454* (2013.01); *G09G 5/14* (2013.01); *G09G 5/373* (2013.01); *G06F 2203/04803* (2013.01); *G09G 2320/0606* (2013.01); *G09G 2354/00* (2013.01); *G09G 2370/06* (2013.01); *G09G 2370/16* (2013.01); *G09G 2370/20* (2013.01)

(58) Field of Classification Search
CPC .. G06F 3/0416; G06F 3/04845; G06F 3/0488; G06F 3/14; G06F 3/1454; G06F 2203/04803; G09G 5/14; G09G 5/373; G09G 2320/0606; G09G 2354/00; G09G 2360/04; G09G 2370/06; G09G 2370/16; G09G 2370/20; H04M 1/7253
See application file for complete search history.

(56) References Cited

U.S. PATENT DOCUMENTS

| | | | |
|---|---|---|---|
| 9,727,298 B2 * | 8/2017 | Naruse | G06F 3/1423 |
| 2015/0199166 A1 * | 7/2015 | Eguchi | G06F 3/1454 |
| | | | 345/2.2 |
| 2018/0074779 A1 * | 3/2018 | Marquardt | H04L 67/38 |

\* cited by examiner

*Primary Examiner* — Nelson M Rosario

(57) ABSTRACT

A touch display device is provided. The touch display device displays images output from a plurality of source computing devices connected thereto on a single screen divided into regions and converts a touch input of a user with respect to the touch display device into a touch input of a source computing device of a corresponding divided region to transmit the converted touch input so as to allow the corresponding source computing device to recognize the converted touch input as a touch input with respect thereto. Further, the touch display device transmits an input and an output of a peripheral connected to the touch display device to a source computing device which is currently selected through the screen divided into regions, thereby allowing the peripheral to operate as if the peripheral is directly connected to the currently selected source computing device.

19 Claims, 7 Drawing Sheets

TOUCH DISPLAY DEVICE

CROSS-REFERENCE TO RELATED APPLICATION(S)

This application claims priority from U.S. Patent Application No. 62/628,299 filed on Feb. 9, 2018, the disclosure of which is incorporated herein by reference in its entirety.

BACKGROUND

1. Field

The following description relates to a touch display device, and more particularly, to a touch display device that outputs an image signal transmitted from a plurality of source computing devices connected thereto to a single screen, which is divided regions, and converts a touch input of a user with respect to a display device into a touch input of a source input device connected thereto to transmit the touch input to a corresponding device.

2. Description of Related Art

Generally, a computing device is configured with a main body and a single display device. It may be convenient to use a plurality of display devices with a single main body or to use a single display device with a plurality of main bodies.

When a monitor selector or a keyboard/video/mouse (KVM) switch is used, a single display device may be used by being connected to a plurality of source computing devices. The monitor selector is used to select a source computing device to which image signals will be output through a plurality of source computing devices connected thereto. That is, the monitor selector is a device used when the plurality of source computing devices share a single display device. The KVM switch is a device which additionally shares and uses input devices such as a keyboard and a mouse in addition to a function of the monitor selector. That is, the KVM switch may share a single display device, a single keyboard, and a single mouse with a plurality of main bodies.

Since the monitor selector or the KVM switch outputs an image signal of a single computing device at a time to a display, it is difficult for a plurality of computing devices to share and collaborate on images at the same time.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a touch display device that simultaneously outputs image signals input from a plurality of source computing devices connected to the touch display device to divided regions of a single screen and converts a touch input of a user with respect to the touch display device into a touch input of a computing device designated to a corresponding divided region.

Further, the following description relates to a touch display device that converts, when a source computing device transmitting a touch input does not support touch input processing, a touch input of a user into an input of a mouse or keyboard or a combination input of the mouse and the keyboard to transmit the converted input.

Furthermore, the following description relates to a touch display device that uses a peripheral connected to the touch display device as a peripheral connected to a selected source computing device.

In one general aspect, a touch display device includes a display, a touch input part, a source device connector, an image processor, and an operation input distributor.

The display may display an image in which an image signal from a source computing device connected thereto is synthesized into a divided screen.

The touch input part may simultaneously output touch input information including at least one touch coordinate according to a touch operation with respect to the display.

The source device connector may include an image input part for receiving an image signal output from a source computing device connected thereto and a data communication part for transmitting and receiving data to and from the connected source computing device. The source device connector may receive the image signal from the source computing device connected thereto and transmit the touch input information thereto.

The image processor may include an image scaling part for scaling each image signal transmitted from the image input part to a predetermined ratio corresponding to a predetermined designated divided region, and an image synthesizer for synthesizing scaled images output from the image scaling part into a single divided screen image so that each of the scaled images is displayed on the designated divided region and output the single divided screen image to the display. The image processor may configure image signals output from one or more source computing devices in a divided screen to output the configured divided screen to the display.

The operation input distributor may include a touch input distributor for converting touch coordinates of the touch input information output from the touch input part into screen coordinates of the source computing device designated to a corresponding divided region. The operation input distributor may transmit a touch input of the user to a source computing device designated to a corresponding divided region.

In another general aspect, the operation input distributor of the touch display device may further include a conversion input distributor for converting the input information, which is converted into the screen coordinates of the source computing device, into mouse input information, keyboard input information, or a combination thereof and providing the converted input information to the corresponding source computing device via the data communication part.

In still another general aspect, the touch display device may further include a peripheral connector and a peripheral connection managing part, thereby allowing the selected source computing device to use a peripheral connected to the touch display device as the peripheral directly connected to the selected source computing device.

Other features and aspects will be apparent from the following detailed description, the drawings, and the claims.

Figure 1:
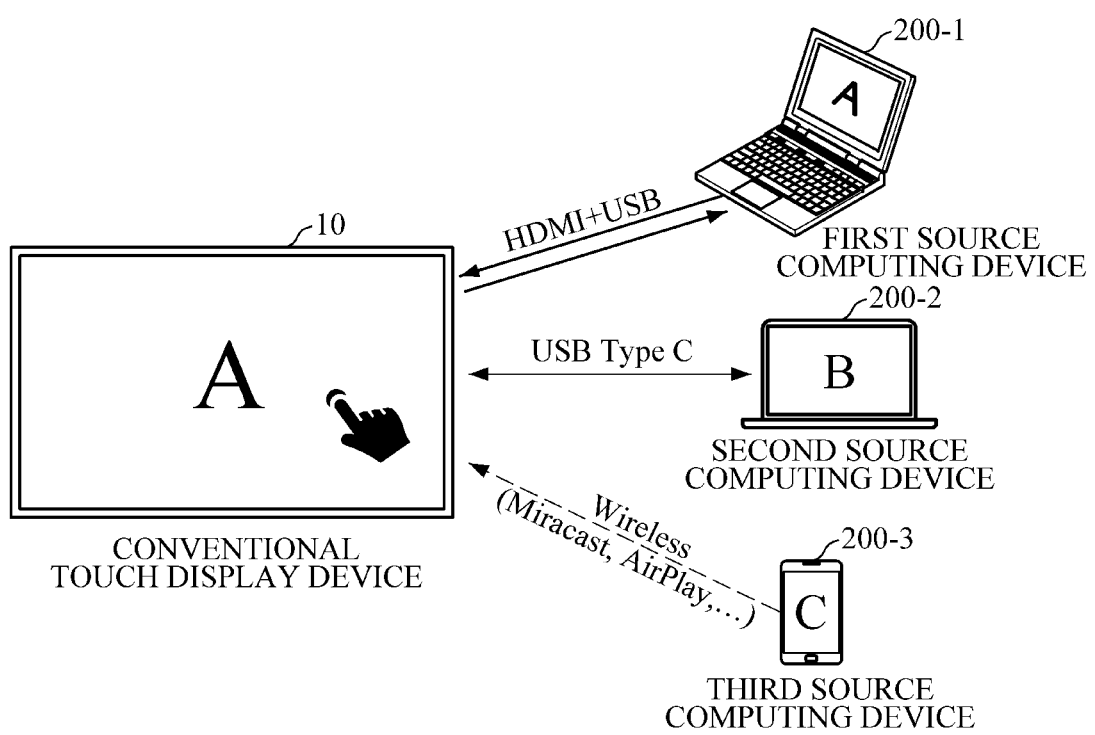
FIG. 1 is a diagram illustrating a conventional touch display device coupled to a source computing device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The foregoing and additional aspects are embodied through exemplary embodiments described with reference to the accompanying drawings. It will be understood that components of each embodiment are capable of being variously combined within an embodiment as long as no other mention or mutual contradiction exists. Each block of a block diagram may represent a physical part in some cases, but in other cases, it may be a portion of a function of a signal physical part or a logical representation of a function over a plurality of physical parts. In some cases, a block or an entity of a part thereof may be a set of program commands. These blocks may be entirely or partially implemented with hardware, software, or a combination thereof.

FIG. 1 is a diagram illustrating a conventional touch display device coupled to a source computing device. Conventionally, a source computing device connected to a touch display device outputs a video output to a high definition multimedia interface (HDMI) or a display port (DP), i.e., outputs an image signal to a touch display device, and receives a touch input of a user from a touch display device 10 via a Universal Serial Bus (USB). The source computing device may include a notebook, a desktop personal computer (PC), a tablet computer, a smart phone, and the like. In the example shown in FIG. 1, three source computing devices 200-1, 200-2, and 200-3 are connected to the conventional touch display device 10. In FIG. 1, a first source computing device 200-1 is connected to the conventional touch display device 10 via an HDMI and a USB. The first source computing device 200-1 outputs an image signal via the HDMI and receives a touch input from a touch display via the USB. In the example of FIG. 1, a second source computing device 200-2 is connected to the conventional touch display device 10 via a USB Type-C. Unlike the first source computing device 200-1, the second source computing device 200-2 may output an image signal and receive a touch input through a single cable. As shown in FIG. 1, a third source computing device 200-3, such as a tablet computer or a smart phone, may be connected to the conventional touch display device 10 through a wireless network without a cable connection. The third source computing device 200-3 may transmit an image signal through a wireless network but may not receive a touch input from the conventional touch display device 10. A transmission protocol used between the third source computing device 200-3 and the conventional touch display device 10 may include Miracast, AirPlay, or the like.

Even when the plurality of source computing devices 200-1, 200-2, and 200-3 are simultaneously connected to the conventional touch display device 10 shown in FIG. 1, the conventional touch display device 10 is able to display an image output from only one among the plurality of source computing devices 200-1, 200-2, and 200-3 at a time. That is, only when a user operates to switch to another source computing device, an output image of a corresponding source computing device can be displayed. Further, a touch input of the touch display can also be transmitted to only a source computing device which is currently selected to display an output image thereon.

Figure 2:
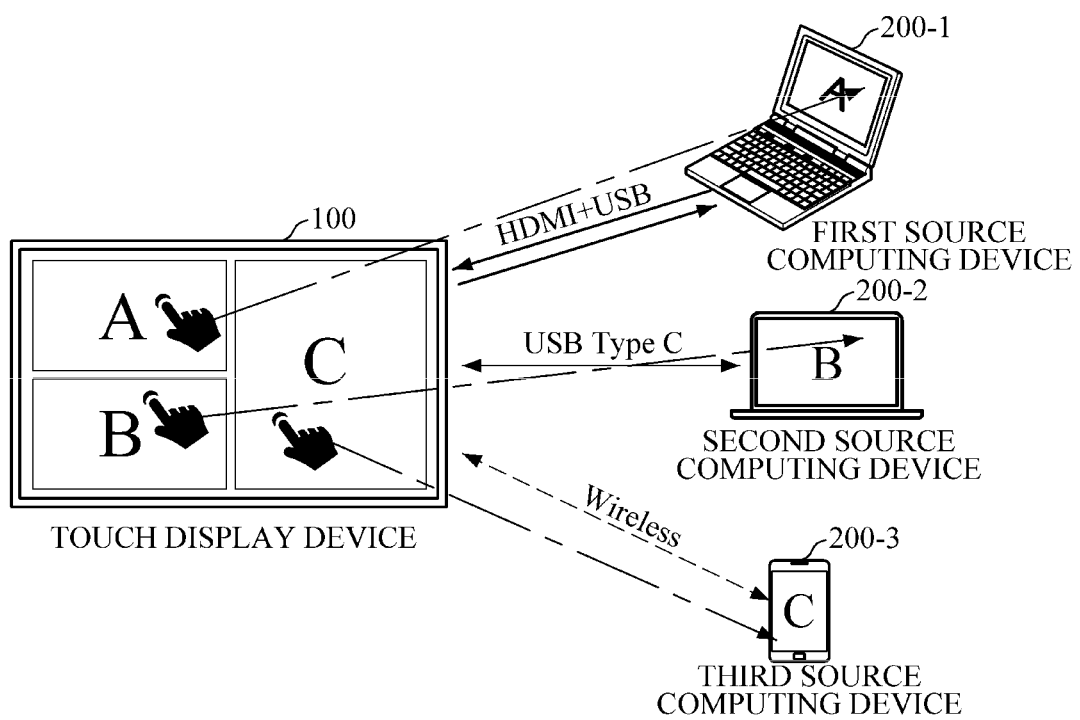
FIG. 2 is a diagram illustrating a touch display of the present invention connected to a plurality of source computing devices according to embodiments.

FIG. 2 is a diagram illustrating a touch display of the present invention connected to a plurality of source computing devices according to embodiments. A touch display device 100 of the present invention may be connected to the plurality of source computing devices 200-1, 200-2, and 200-3 through wired or wireless communication. However, unlike the conventional touch display device 10, the touch display device 100 is able to display all image signals of the plurality of source computing devices 200-1, 200-2, and 200-3 in divided regions of a single display screen by dividing the image signals. A source computing device connected to the touch display device 100 of the present invention also outputs a video output, i.e., an image signal, to the touch display device 100 via an HDMI or a DP and receives a touch input of a user from the touch display device 100 via a USB. In the example shown in FIG. 2, three source computing devices 200-1, 200-2, and 200-3 are connected to the touch display device 100 of the present invention. In FIG. 2, the first source computing device 200-1 is connected to the touch display device 100 of the present invention via an HDMI and a USB. The first source computing device 200-1 outputs an image signal via the HDMI and receives a touch input from the touch display device 100 via the USB. In the example of FIG. 2, a second source computing device 200-2 is connected to the touch display device 100 of the present invention via a USB Type-C. Unlike the first source computing device 200-1, the second source computing device 200-2 may output an image signal and receive a touch input through a single cable. As shown in FIG. 2, a third source computing device 200-3, such as a tablet computer or a smart phone, may be connected to the touch display device 100 of the present invention through a wireless network without a cable connection. The third source computing device 200-3 may transmit an image signal and may receive a touch input from the touch display device 100 of the present invention through a wireless network.

The touch display device 100 of the present invention shown in FIG. 2 transmits a touch input with respect to each of divided regions to a source computing device corresponding to a touched divided region. During the transmission, the touch display device 100 transmits touch coordinates to the corresponding source computing device on which an output image is being displayed by calibrating, i.e., converting the touch coordinates into coordinates of the corresponding source computing device. In this case, the corresponding source computing device operates in the same manner as when a screen of the corresponding source computing device is directly touched. To this end, a device driver for receiving a touch input may be installed in each of the three source computing devices 200-1, 200-2, and 200-3.

Figure 3:
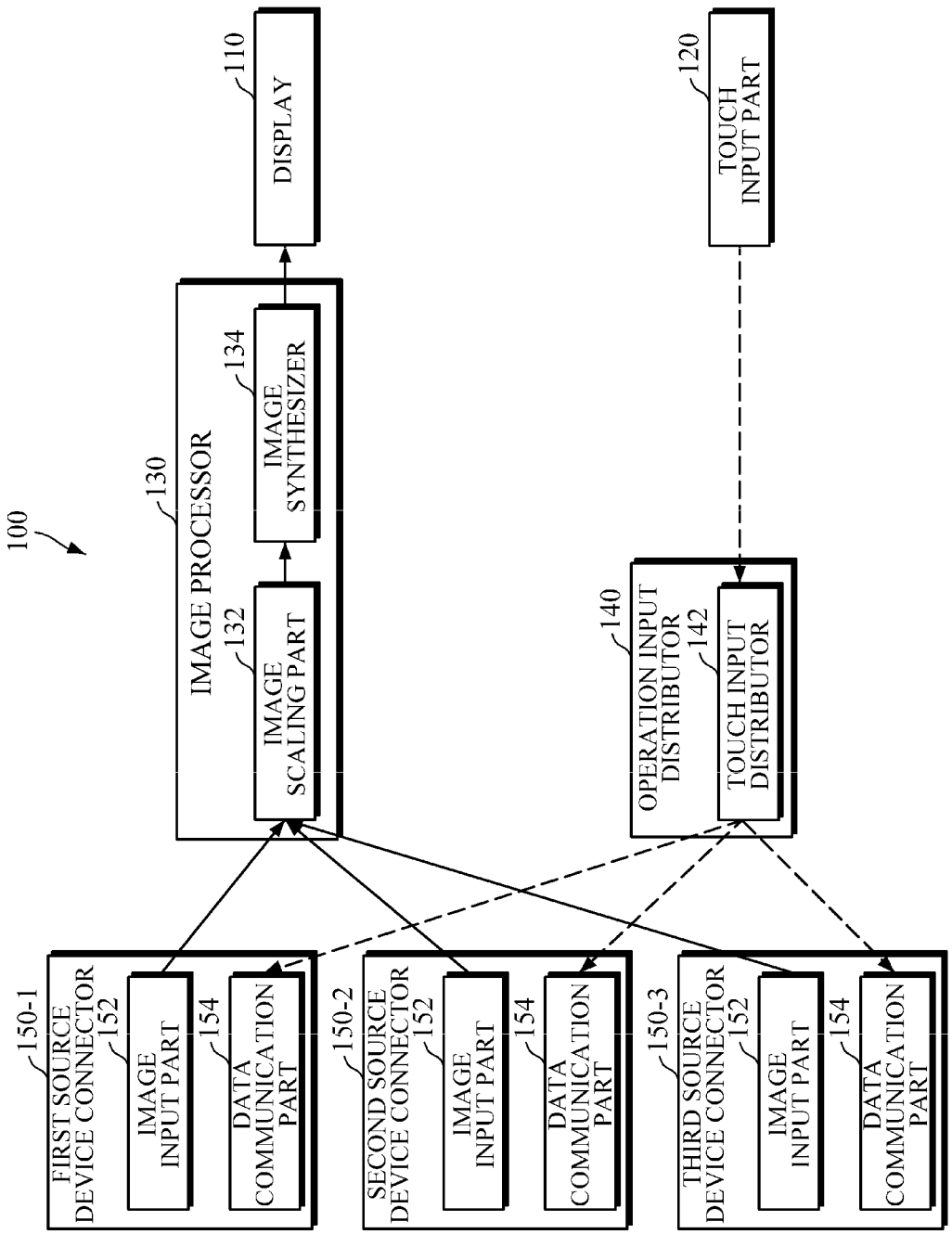
FIG. 3 is a block diagram of a touch display device according to one embodiment.

FIG. 3 is a block diagram of a touch display device according to one embodiment. According to one aspect of the present invention, the touch display device 100 includes a display 110, a touch input part 120, a source device connector 150, an image processor 130, and an operation input distributor 140.

The display 110 includes a display panel capable of receiving a touch input and displays an image signal input from a source computing device connected thereto in the form of a divided screen. A user may touch the display panel for operation.

The touch input part 120 outputs touch input information including one or more coordinates at the same time according to a touch operation with respect to the display 110. The touch input may include touch of a user's finger or a multi-touch gesture input. Further, the touch input may include a touch input via a touch member such as a touch pen.

The source device connector 150 includes an image input part 152 and a data communication part 154. The source device connector 150 receives an image signal from a source computing device and transmits touch input information and the like to the source computing device. The touch display device 100 may include at least one source device connector 150.

The source device connector 150 is a wired source device connector connected to a source computing device via a wired connection and configured to receive an image signal and receive and transmit data or a wireless source device connector connected to a source computing device via a wireless connection and configured to receive an image signal and receive and transmit data.

The image input part 152 receives an image signal output from a source computing device connected thereto. According to some aspects of the present invention, the image input part 152 may include a port of an HDMI or DP to receive an image signal via a cable connected to the port of the HDMI or DP. However, the present invention is not limited thereto, and the image input part 152 may receive an image signal via a digital visual interface (DVI) or a D-subminiature (D-Sub) port.

According to another aspect of the present invention, when the image input part 152 is wirelessly connected, the image input part 152 may receive image data transmitted via Wi-Fi. There is no limit to a transport protocol used in this process. However, a separate device driver for supporting the transport protocol may be installed in a source computing device.

The data communication part 154 transmits and receives data to and from a connected source computing device. According to some aspects of the present invention, the data communication part 154 may be connected to a source computing device via a USB cable. Software or a device driver for receiving data transmitted from the data communication part 154 of the touch display device 100 may be installed in a source computing device. In this case, there is no limit to a protocol used for data communication.

According to another aspect of the present invention, when the data communication part 154 is wirelessly connected, the touch display device 100 may transmit and receive data to and from a source computing device via Wi-Fi. In this case, there is no limit to a transport protocol used during the transmission and reception of data. A separate device driver may be installed in the source computing device so as to receive data, such as touch input information and the like, transmitted from the touch display device 100.

The image processor 130 includes an image scaling part 132 and an image synthesizer 134 and configures image signals output from one or more source computing devices as a divided screen to output the divided screen to the display 110.

The image scaling part 132 scales a size of the divided screen according to a predetermined screen division setting, i.e., scales an image signal input with a ratio corresponding to a resolution and then outputs the scaled image signal. That is, the image scaling part 132 scales the image signal transmitted from each of the image input parts 152 with a ratio corresponding to a designated divided region in advance. For example, when the display 110 is predetermined to divide and display a screen into four divided regions, i.e., an upper left divided region, an upper right divided region, a lower left divided region, and a lower right divided region, the three source computing devices 200-1, 200-2, and 200-3 are connected to the display 110 to display images thereof through three source device connectors 150-1, 150-2, and 150-3, and when the upper left divided region, the upper right divided region, and the lower left divided region are respectively designated to the three source computing devices 200-1, 200-2, and 200-3, the image scaling part 132 scales down or up and outputs a corresponding image with a ratio corresponding to a size of the upper left divided region, the upper right divided region, or the lower left divided region in real time. Alternatively, when a maximum number of divided regions in a screen division setting is set in advance, and a screen division method is predetermined according to the maximum number of divided screens (e.g., in a case in which a screen is divided into three regions such as an upper left divided region, a lower left divided region, and a right divided region), the image scaling part 132 may divide a region of the screen to correspond to a number of source computing devices and may scale to output an image signal output of each of the source computing devices by corresponding to the divided region. In this case, the orders in which the divided regions are designated and in which the source device connectors 150-1, 150-2, and 150-3 are designated to the divided regions are predetermined.

According to some aspects of the present invention, the image scaling part 132 may include a plurality of image scalers, each of which is configured with a computer program or a logic circuit for performing image scaling, so that each of the plurality of image scalers may be mapped to a corresponding one of the image input parts 152.

The image synthesizer 134 synthesizes the scaled images output from the image scaling part 132 into a single divided screen image and outputs the single divided screen image to the display 110 so as to allow each of the scaled images to be displayed in a designated divided region. In this case, when the number of divided regions is larger than that of input signals, the image synthesizer 134 may synthesize the input images by indicating a screen corresponding to a divided region with no image signal input so as to distinguish the screen from other screens (e.g., a black screen or an image screen on which a phrase indicating no image signal is continuously displayed, or the like).

The operation input distributor 140 includes a touch input distributor 142 and transmits a touch input of the user to a source computing device designated to a corresponding divided region.

The touch input distributor 142 converts touch coordinates of the display 110 into screen coordinates of a corresponding source computing device so as to allow the source computing device designated to the corresponding divided region which the user touches to recognize the touching as the user directly touching a screen of the corresponding source computing device. That is, the touch input distributor 142 converts touch coordinates of touch input information output from the touch input part 120 into screen coordinates of a source computing device designated to a corresponding divided region and transmits the touch input information to the corresponding source computing device via the data communication part 154. In this case, a device driver may be installed in the source computing device to process the received touch input information into data represented as a screen of the source computing device being touched.

Figure 4:
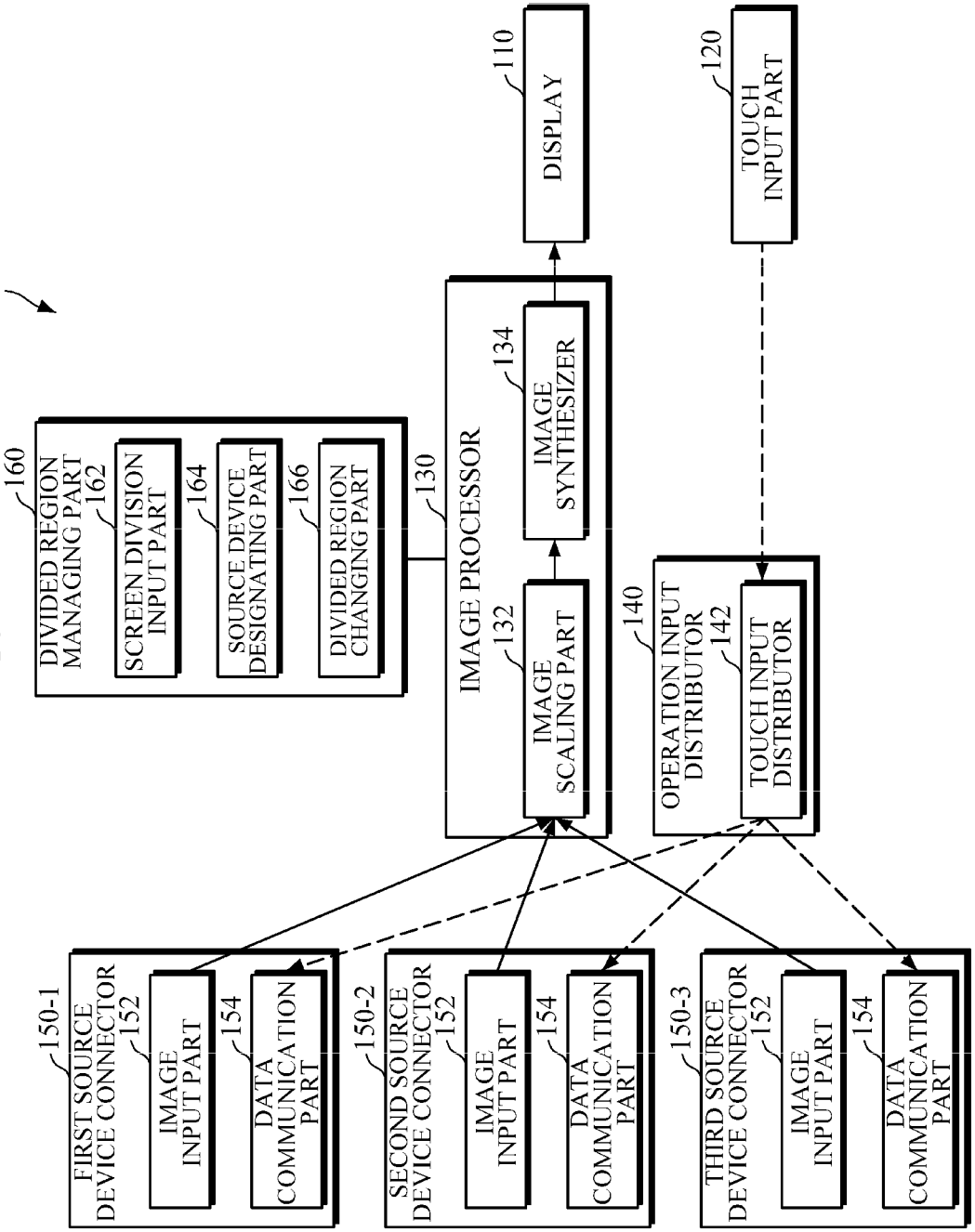
FIG. 4 is a block diagram of a touch display device according to another embodiment that is capable of setting a divided region.

FIG. 4 is a block diagram of a touch display device according to another embodiment that is capable of setting a divided region. According to another aspect of the invention, the touch display device 100 includes a display 110, a touch input part 120, a source device connector 150, an image processor 130, and an operation input distributor 140 and further includes a divided region managing part 160.

The display 110, the touch input part 120, the source device connector 150, the image processor 130, and the operation input distributor 140 are identical to those which are described above.

The divided region managing part 160 may include a screen division input part 162 and a source device designating part 164 to allow the user to set a divided region and map the divided region to a source computing device.

The screen division input part 162 may receive arrangement information on the divided region with respect to a screen division from the user. For example, the user may touch a specific region on a screen of the display 110 or input a specific multi-touch gesture and drive an input screen user interface (UI) for inputting the arrangement information on the divided region with respect to the screen division, thereby inputting the arrangement information on a required number of divided screens, a size of each of the divided screens, and the like.

The source device designating part 164 may designate a source computing device connected to the source device connector 150 for each of divided regions which are divided according to a user operation.

According to an additional aspect of the present invention, the divided region managing part 160 of the touch display device 100 may further include a divided region changing part 166.

The divided region changing part 166 may adjust, i.e., change, a position and a size of a divided region according to a user operation. For example, the user may change a size of a divided region by touching and dragging a corner portion of the divided region displayed on a screen and may change a position of a specific divided region by touching the specific divided region and then dragging the specific divided region to another divided region.

In some embodiments of the present invention, a source computing device connected to the touch display device 100 may be a device which is not able to process a touch input. In this case, it is required to convert the touch input into another input form and transmit the converted input form to a corresponding source computing device.

Figure 5:
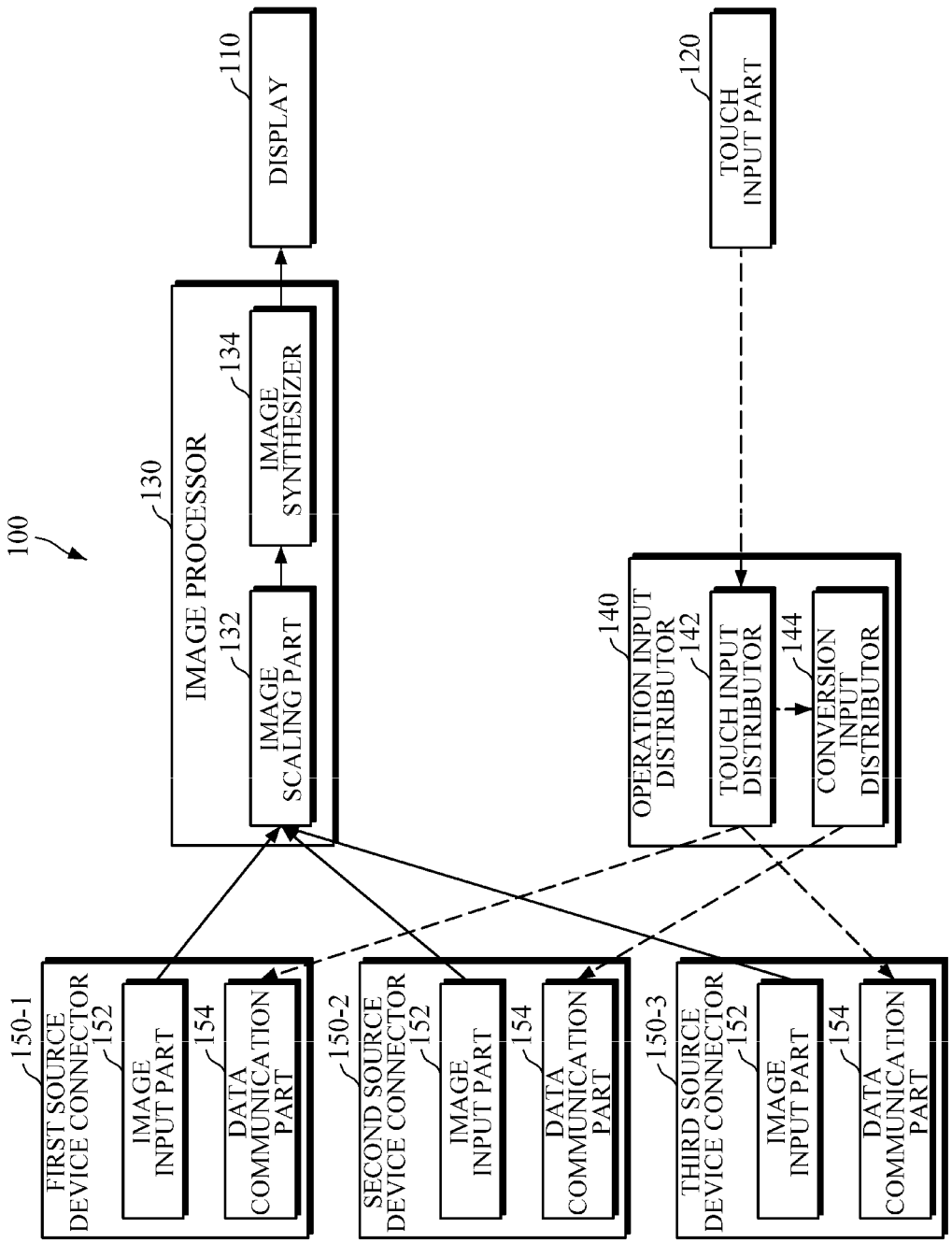
FIG. 5 is a block diagram of a touch display device according to still another embodiment that is capable of converting a touch input to another input form.

FIG. 5 is a block diagram of a touch display device according to still another embodiment that is capable of converting a touch input into an another input form. According to still another aspect of the present invention, the touch display device 100 may include a display 110, a touch input part 120, a source device connector 150, an image processor 130, and an operation input distributor 140.

The display 110, the touch input part 120, the source device connector 150, and the image processor 130 are identical to those which are described above.

The operation input distributor 140 may further include a conversion input distributor 144 in addition to the above-described touch input distributor 142.

In order to allow a source computing device that is not able to process a touch input to use a touch input of the touch display device 100 of the present invention, the conversion input distributor 144 may convert touch input coordinates into screen coordinates of a source computing device, convert the touch input information converted by the touch input distributor 142 into mouse input information, keyboard input information, or a combination thereof so as to display a result as being similar to the touch input, and transmit the screen coordinates and the converted input information to a corresponding source computing device via the data communication part 154. For example, a simple touch input may be converted into a left button click of a mouse, and a touch-and-scroll input may be converted into a wheel button scroll input of the mouse. Further, a pinch operation input for zooming in or out a screen by multi-touch may be converted into a combination of a specific key of a keyboard and a wheel scroll input of a mouse. In this case, it may be required for a corresponding source computing device to set a touch input to another input in the designated divided region.

Figure 6:
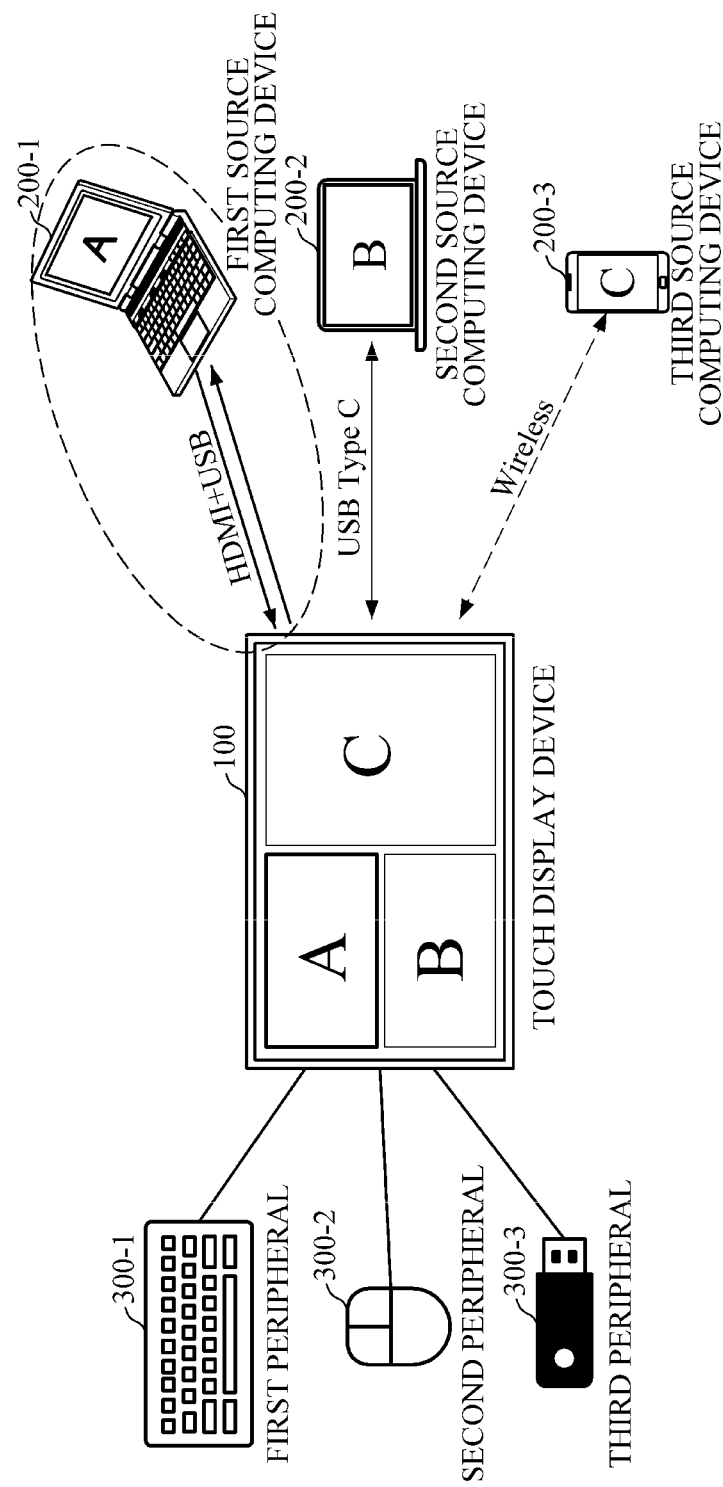
FIG. 6 is a diagram illustrating a touch display of the present invention to which a plurality of peripherals are connected according to various embodiments.

FIG. 6 is a diagram illustrating a touch display of the present invention to which a plurality of peripherals are connected according to various embodiments. A touch display device 100 of the present invention may be connected to the plurality of source computing devices 200-1, 200-2, and 200-3 through wired or wireless communication. However, unlike the conventional touch display device 10, the touch display device 100 is able to display all image signals of a plurality of source computing devices 200-1, 200-2, and 200-3 on divided regions of a single display screen of a single display 110 by dividing the image signals. In the example shown in FIG. 6, three source computing devices 200-1, 200-2, and 200-3 are connected to the touch display device 100 of the present invention, and the touch display device 100 displays the image signals on the single display 110 by dividing the image signals. Further, in the example shown in FIG. 6, three peripherals 300-1, 300-2, and 300-3 are connected to the touch display device 100 of the present invention. The peripherals 300-1, 300-2, and 300-3 operate as if the peripherals 300-1, 300-2, and 300-3 are directly connected to the first source computing device 200-1 designated to a divided region of the touch display 110 of FIG. 6 in which A is displayed. Since a conventional touch display displays an image signal of only a single source computing device at a time, it is immediately verified which peripheral device is connected to which source computing device. However, the display 110 of the present invention divides a screen into a plurality of divided regions and displays the image signals of the source computing devices 200-1, 200-2, and 200-3 on the plurality of divided regions. Therefore, in order to discriminate a source computing device to which peripherals are currently connected, a corresponding divided region is discriminately displayed from other divided regions. In the example of FIG. 6, an edge of the corresponding divided region is indicated as being distinguished from the other divided regions. In this case, the corresponding source computing device operates in the same manner as the peripherals are directly connected thereto. To this end, a device driver for receiving an input from a peripheral or outputting an output to the peripheral may be installed on each of the source computing devices.

Figure 7:
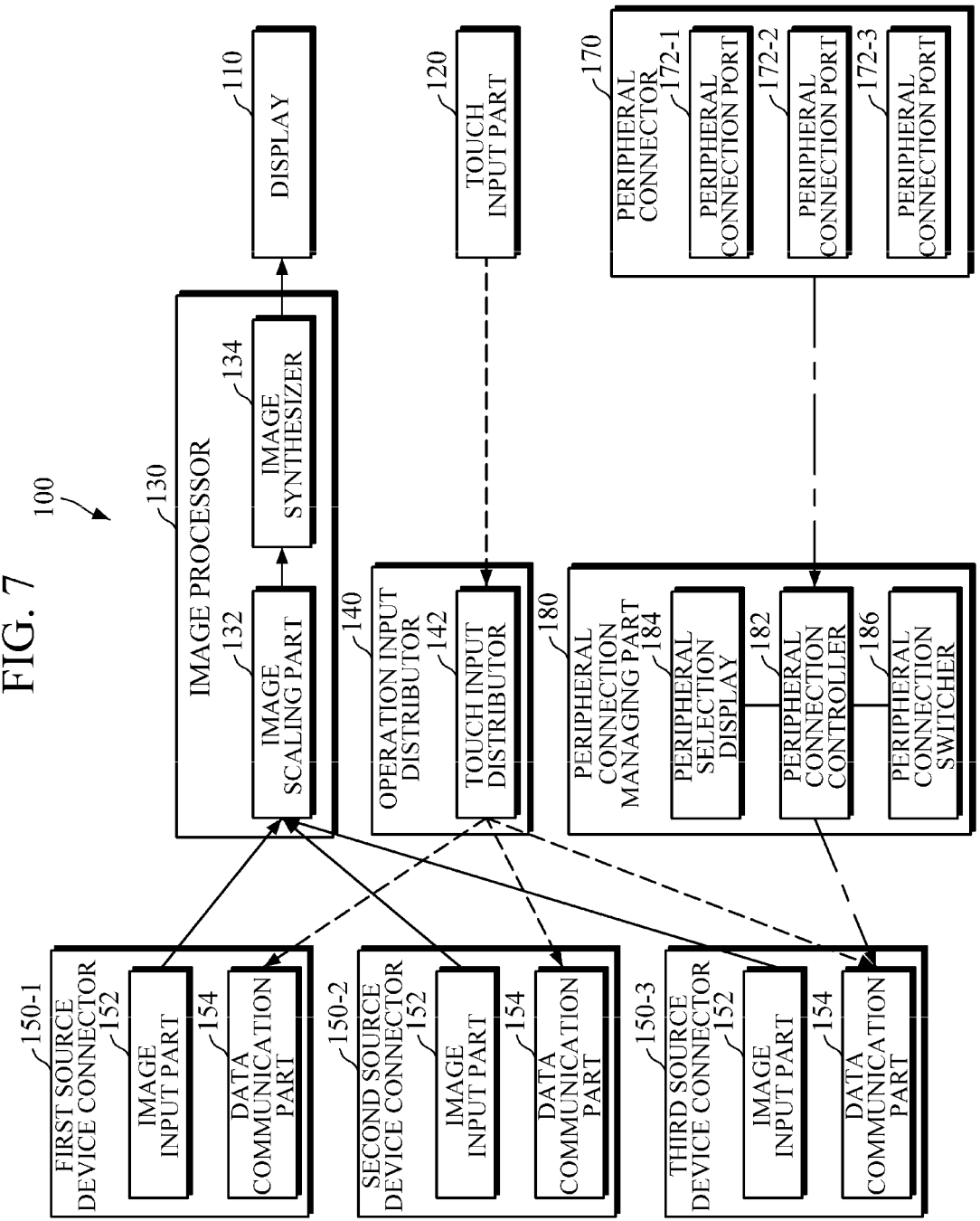
FIG. 7 is a block diagram of a touch display device according to yet another embodiment that is capable of connecting to peripherals.

FIG. 7 is a block diagram of a touch display device according to yet another embodiment that is capable of connecting to peripherals. According to yet another aspect of the invention, the touch display device 100 includes a display 110, a touch input part 120, a source device connector 150, an image processor 130, and an operation input distributor 140 and further includes a peripheral connector 170.

The display 110, the touch input part 120, the source device connector 150, the image processor 130, and the operation input distributor 140 are identical to those which are described above.

The peripheral connector 170 may include at least one peripheral connection port 172 to connect to peripherals such as an input device including a keyboard and a mouse, an auxiliary storage device including a USB storage device, and the like. There is no limit to a peripheral which can be connected to the touch display device 100, but the peripheral may be a device for supporting a USB connection in consideration of a hot-plug-in function. In addition, peripherals, such as a camera, a microphone, a speaker, and the like, may be connected to the touch display device 100.

According to an additional aspect of the present invention, the touch display device 100 may further include a peripheral connection managing part 180. The peripheral connection managing part 180 allows peripherals connected to the touch display device 100 to operate as peripherals directly connected to a source computing device selected by a user touch operation. The peripheral connection managing part 180 may include a peripheral connection controller 182.

The peripheral connection controller 182 may transmit and receive an input or an output of a peripheral to and from a source computing device so as to allow the peripheral connected to the peripheral connector 170 to be recognized as a peripheral directly connected to a source computing device of a divided region which a user touches. In this case, a device driver for allowing a peripheral to operate as if the peripheral is directly connected to a source computing device may be installed in a corresponding source computing device.

According to an additional aspect of the present invention, the peripheral connection managing part 180 may further include a peripheral selection display 184, which recognizes a peripheral connected to the peripheral connector 170 as a peripheral directly connected to the source computing device, for discriminating and displaying a divided region of a source computing device from divided regions of other source computing devices. Since the touch display device 100 displays screens of source computing devices connected thereto at once on a divided screen, it is required to discriminately display a source computing device operating as a current peripheral that is directly connected thereto to the user. For example, the peripheral selection display 184 may highlight an edge of a divided region displaying a screen of a currently selected source computing device to be distinguished from edges of other divided regions.

According to an additional aspect of the present invention, the peripheral connection managing part 180 may further include a peripheral connection switcher 186 for switching a source computing device to which a peripheral is connected by allowing a user to touch a divided region of another source computing device, which is not a source computing device recognizing a peripheral connected to the peripheral connector 170 as a peripheral directly connected to the source computing device. That is, in the example shown in FIG. 6, when the user touches a divided region on which B is displayed instead of touching the divided region on which A is displayed of the first source computing device 200-1 to which a current peripheral is connected, an edge of the divided region on which B is displayed is displayed to be highlighted and peripherals also operate as if the peripherals are directly connected to the second source computing device 200-2.

In accordance with a touch display device of the present invention, image signals input from a plurality of source computing devices connected to the touch display device can be simultaneously output to divided regions of a single screen, and a touch input of a user with respect to the touch display device can be converted into a touch input of a computing device designated to a corresponding divided region.

Further, in accordance with the touch display device of the present invention, when a source computing device transmitting a touch input does not support a touch input process, the touch input can be convert into an input of another input device and transmitted thereto.

Furthermore, in accordance with the touch display device of the present invention, a peripheral connected to a touch display device can be used as a peripheral connected to a selected source computing device.

While the exemplary embodiments of the present invention have been described with reference to the accompanying drawings, the present invention is not limited thereto, and it should be understood that various modifications can be devised by those skilled in the art from the present invention. The appended claims are intended to cover such modifications.

What is claimed is:

1. A touch display device comprising:
a display;
a touch input part configured to receive a touch input caused by a touch operation on the display and generate touch input information, wherein the touch input information comprises at least one touch coordinate generated based on the touch operation on the display;
at least one source device connector including an image input part configured to receive an image signal output from a source computing device connected thereto and a data communication part configured to transmit and receive data to and from the source computing device connected thereto;
an image processor including an image scaling part configured to scale each image signal transmitted from the image input part to a predetermined ratio corresponding to a predetermined designated divided region, and an image synthesizer configured to synthesize scaled images into a single image on a screen, wherein the single image comprises a plurality of divided regions so that each of the scaled images is displayed on the designated divided region and output the single image to the display; and
an operation input distributor including a touch input distributor configured to convert the at least one touch coordinate of the touch input information output from the touch input part into at least one screen coordinate of the source computing device designated to a corresponding divided region and transmit the touch input information to the corresponding source computing device via the data communication part based upon which one of the plurality of divided regions the touch input was received on.

2. The touch display device of claim 1, wherein the source device connector includes either a wired source device connector, which is connected to the source computing device via a wired connection and is configured to receive an image signal and receive and transmit data, or a wireless source device connector which is connected to the source computing device via a wireless connection and is configured to receive an image signal and receive and transmit data.

3. The touch display device of claim 1, further comprising a divided region managing part including a screen division input part configured to receive arrangement information of the divided regions for a screen division from a user and a source device designating part configured to designate the source computing device that is connected to the source device connector corresponding to the one of the plurality of divided regions according to a user operation.

4. The touch display device of claim 3, wherein the divided region managing part further includes a divided region changing part configured to adjust a position and a size of the divided region according to a user operation.

5. The touch display device of claim 1, wherein the operation input distributor further includes a conversion input distributor configured to convert the touch input information, which is converted into the screen coordinates of the source computing device, into mouse input information, keyboard input information, or a combination thereof and provide the converted input information to the corresponding source computing device via the data communication part.

6. The touch display device of claim 1, further comprising a peripheral connector including at least one peripheral connection port,
wherein a peripheral connected to the peripheral connector includes an input device and an auxiliary storage device.

7. The touch display device of claim 6, further comprising a peripheral connection managing part including a peripheral connection controller configured to transmit and receive an input or an output of the peripheral to and from the source computing device so as to allow the peripheral connected to the peripheral connector to be recognized as the peripheral directly connected to the source computing device corresponding to the divided region which the user touches.

8. The touch display device of claim 7, wherein the peripheral connection managing part further includes a peripheral selection display configured to discriminate and display the divided region of the source computing device, which recognizes the peripheral connected to the peripheral connector as the peripheral directly connected to the source computing device, from divided regions of other source computing devices.

9. The touch display device of claim 8, wherein the peripheral connection managing part further includes a peripheral connection switcher configured to switch the source computing device to which the peripheral is connected by allowing a user to touch a divided region of another source computing device, which is not the source computing device recognizing the peripheral connected to the peripheral connector as the peripheral directly connected to the source computing device.

10. A method of operating a touch device, comprising:
receiving a plurality of video signals from a plurality of source devices, wherein each of the plurality of video signals comprises a respective video image;
displaying an image on a touch screen, wherein the image comprises a plurality of image regions, and each of the plurality of image regions comprises at least a part of the respective video image;
receiving a touch input on the touch screen;
determining on which one of the plurality of image regions the touch input was received, wherein each one of the plurality of image regions corresponds to a respective one of a plurality of input devices;
obtaining a coordinate of the touch input on the touch screen;
determining a converted coordinate based on the coordinate of the touch input; and
transmitting a signal comprising information indicating the converted coordinate to the one of the plurality of input devices corresponding to the determined image regions on which the touch input was received.

11. The method of claim 10, further comprising:
receiving a user input; and
changing one of a position and a size of one of the plurality of image regions based on the user input.

12. The method of claim 10, wherein none of the plurality of image regions overlaps with each other.

13. The method of claim 10, further comprising:
determining an input device whose image is to be displayed on one of the plurality of image regions; and
scale up or down a video image inputted from the input device based on a size of the one of the plurality of image regions.

14. The method of claim 10, further comprising:
receiving another touch input simultaneously with the touch input on the touch screen.

15. A touch device, comprising:
a touch screen;
a memory;
at least one processor operably coupled to the memory,
wherein the processor, when executing program instructions stored in the memory, is configured to:
cause the touch device to receive a plurality of video signals from a plurality of source devices, wherein each of the plurality of video signals comprises a respective video image;
cause the touch device to display an image on a touch screen, wherein the image comprises a plurality of image regions, and each of the plurality of image regions comprises at least a part of the respective video image;
cause the touch device to display an image on the touch screen, wherein the image comprises a plurality of image regions;
cause the touch device to receive a touch input on the touch screen;
determine on which one of the plurality of image regions the touch input was received, wherein each one of the plurality of image regions corresponds to a respective one of the plurality of input devices;
obtain a coordinate of the touch input on the touch screen;
determine a converted coordinate based on the coordinate of the touch input; and
cause the touch device to transmit a signal comprising information indicating the converted coordinate to the one of the plurality of input devices corresponding to the determined image regions on which the touch input was received.

16. The touch device of claim 15, wherein the at least one processor is further configured to:
cause the touch device to receive a user input; and
cause the touch device to change one of a position and a size of one of the plurality of image regions based on the user input.

17. The touch device of claim 15, wherein none of the plurality of image regions overlaps with each other.

18. The touch device of claim 15, further comprising:
cause the touch device to receive another touch input simultaneously with the touch input on the touch screen.

19. The touch device of claim 15, wherein the at least one processor is further configured to:
determine an input device whose image is to be displayed on one of the plurality of image regions; and
scale up or down a video image inputted from the input device based on a size of the one of the plurality of image regions.

* * * * *